United States Patent Office
3,293,188
Patented Dec. 20, 1966

3,293,188
PREPARATION OF DICHLOROCYANURATE, SODIUM TRIPOLYPHOSPHATE AND SODIUM SULFATE CONTAINING BLEACHING, STERILIZING AND DISINFECTING COMPOSITION
Arthur G. Brown, Menlo Park, and William W. Lee and Kenneth M. Sancier, Palo Alto, Calif., assignors to Procter & Gamble Company, Cincinnati, Ohio, a corporation of Ohio
No Drawing. Filed June 29, 1959, Ser. No. 823,280
2 Claims. (Cl. 252—187)

This invention relates to a bleaching, sterilizing and disinfecting composition that may be prepared and stored as a dry, free-flowing powdery material. The application is a continuation-in-part of copending application Serial No. 608,698, filed September 10, 1956, now Patent No. 2,913,460, issued November 17, 1959.

Sodium hypochlorite bleaching and disinfectant compositions are very effective and have found widespread acceptance when packaged and sold in the form of aqueous solutions. However, there has been a trend toward the development of compounds packaged in the form of dry powders that have similar bleaching and antiseptic properties, because for certain special purposes they are more convenient to handle, package and ship. Calcium hypochlorite was one of the first compounds proposed as a component of a dry bleach composition. Although this compound provides bleaching and disinfecting properties when dissolved in water, the calcium ion introduces additional hardness to the water, and the concentrated solutions required for removing stains from fabrics produce a heavy sediment. In addition the resultant precipitate of calcium carbonate usually contains occluded hypochlorite which deposits on the clothes during washing and remains to cause damage when the hypochlorite decomposes.

Solid organic compositions such as 1,3-dichloro-5,5-dimethylhydantoin and trichlorocyanuric acid have also been packaged in powder form for use as bleaching and disinfecting agents. However, the 1,3-dichloro-5,5-dimethylhydantoin is not very efficient. Also, since this compound has a low solubility in water, it is difficult to rinse all traces of the compound from fabrics. The residual compound causes damage to automatic dryers, and also damages fabrics when they are ironed.

Trichlorocyanuric acid, also known as trichloroisocyanuric acid, is a solid compound that is effective as a bleaching and disinfecting agent when the freshly prepared compound is moistened or dissolved in water. However, the solid trichlorocyanuric acid rapidly loses its available chlorine under conditions of relatively high atmospheric temperatures and high humidity, and it is not very stable when moistened or when dissolved in water to form an aqueous solution. Also, when dry trichlorocyanuric acid is mixed with solid, dry chemical fillers in order to prepare a suitable commercial composition, there is a definite tendency for stratification to occur in the packaged product when it is moved or shipped because of the inherent difference in particle size and density of the trichlorocyanuric acid and the fillers. Stratification of the active ingredient and the filler is very undesirable, since users are unable to obtain uniform results with portions of the composition taken from different parts of a package. This lack of uniformity is particularly dangerous when the composition is employed to disinfect sick-room articles.

In order to produce a dry substantially homogeneous mixture of trichlorocyanuric acid and filler that will be uniformly distributed throughout a package, attempts have been made to mix the acid and filler in the presence of water, and then eliminate the water. This procedure has been unsuccessful because of the instability of trichlorocyanuric acid in the presence of water. For example, a spray dried mixture of trichlorocyanuric acid and filler would be homogeneous and be readily soluble in water. However, when a slurry or aqueous solution of trichlorocyanuric acid and a suitable alkaline filler is spray dried, it loses as much as 40 percent of its available chlorine during the spray drying process.

One of the objects of this invention is to produce a stable solid organic compound of high available chlorine content that quickly dissolves in water to provide a solution that has good bleaching and disinfecting properties when the compound is used either alone or more desirably mixed with suitable synergistic carrier agents.

A further object of this invention is to produce such a solid compound in the form of powder or flakes that will not cake, lump nor deliquesce when compounded and packaged, but which will remain free flowing and stable even under conditions of high temperatures and high humidity.

Another object is to provide a solid organic compound that has bleaching, sterilizing, and disinfecting properties, and which remains stable when mixed with a synergistic carrier agent in the presence of moisture to provide a homogeneous mixture that does not stratify when dried and packaged.

Other objects and advantages of this invention will be apparent from the following description.

To summarize this invention, the foregoing objects are obtained and an excellent stable bleaching sterilizing and disinfecting agent is provided by halogenating cyanuric acid with a halogen, preferably chlorine, until the dihalocyanurate is formed. In acid solution hydrogen dihalocyanurate, or in other words dihalocyanuric acid, is the product; and in basic solution the product is composed of the dihalocyanurate anion and the cation of the base.

Both dihalocyanuric acid and its salts are herein referred to as dihalocyanurates, since they contain the dihalocyanurate anion which provides the available halogen that gives the compound its properties. The dihalocyanurate is dried for storage and packaging, and then placed in the presence of water when it is to be used as a bleaching, sterilizing and disinfecting agent.

Although the dihalocyanuric acid or its salts may be employed alone, for most purposes they are more advantageously utilized in a mixture with a non-hydroscopic synergistic carrier agent which is soluble in water, inert to the dihalocyanuric acid, and which increases and controls the pH of the solution of dihalocyanuric acid up to about 11. The dihalocyanurate is most advantageously utilized in a solution having a pH range of from about 6.5 to 9.5, and the carrier agent is preferably a buffer which controls the pH within this optimum activity range.

Since the dichlorocyanurate is the least expensive of the dihalocyanurates and has the greatest commercial value and usefulness, the chlorinated compound is employed for most purposes. Dibromocyanurate and diiodocyanurate are prepared in the same manner and they are similar in properties to the dichlorocyanuric acid, except that they exhibit a tendency to attack cotton fibers.

In greater detail, the dihalocyanurate is prepared by halogenating cyanuric acid with any suitable halogenating agent until dihalocyanurate is formed. Cyanuric acid is well known and it is readily available commercially. An advantageous method of effecting chlorination of cyanuric acid is directly with elemental chlorine in an aqueous solution by bubbling in chlorine gas. However, other sources of chlorine may be utilized.

The pH of the solution is not critical and the direct chlorination to the dichlorocyanurate may be conducted in acidic or basic solution. However, it is most advantageous to increase the pH of the solution by adding a base, because more cyanuric acid dissolves as the pH is increased and the chlorination reaction proceeds more rapidly. It has been found most convenient to conduct the chlorination by dissolving in water a ratio of about 1 mol of cyanuric acid with sufficient base to provide a molar equivalent of two mols of hydroxide ion, and then bubbling in about two mols of chlorine. In this procedure, two of the three hydrogen atoms on the cyanuric acid are neutralized and then replaced by chlorine to form a dichlorocyanuric acid precipitate as shown by the following equation in which M is most advantageously sodium or potassium:

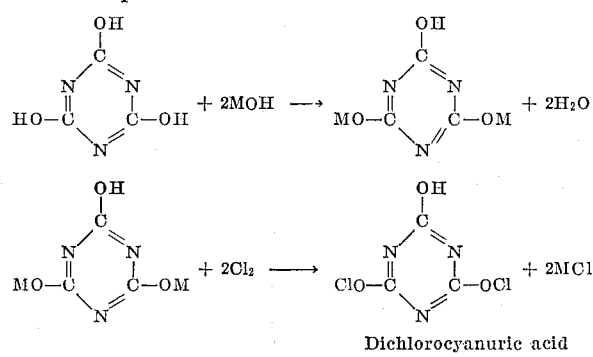

Dichlorocyanuric acid

The structure of dichlorocyanuric acid varies between a number of forms because of tautomerism in the molecule. For example, the three oxygens can be attached to the three carbons by double bonds, and the two chlorines attached to two nitrogens with the other nitrogen being occupied by a hydrogen. The empirical formula of the dichlorocyanuric acid is in all cases $C_3N_3O_3Cl_2H$. If more than two mols of base is employed so that the sodium salt of dichlorocyanuric acid is produced, acid may be conveniently added in order to recover dichlorocyanuric acid as a precipitate. The reaction is most conveniently carried out in an aqueous medium since water is inexpensive and a relatively good solvent for cyanuric acid. If desired, other non-aqueous solvents for cyanuric acid, such as carbon tetrachloride or chloroform may be employed instead of water, but because of the low solubility of cyanuric acid in these solvents it is best to carry out the reaction in aqueous solutions.

In accordance with this invention, the temperature at which the chlorination reaction is conducted may be varied between about 0° C. and 50° C. Outside of this range, poor yields of dichlorocyanuric acid are obtained. Furthermore, the reaction is preferably carried out at temperatures above about 5° C. since there is a tendency to form trichlorocyanuric acid if excess chlorine is added to the reaction mixture at lower temperatures. Consequently, the reaction is most advantageously conducted at the ambient room temperature of about 20° C. to 30° C. This is a substantial advantage, since neither cooling nor heating is essential in order to complete the reaction.

The chlorine is bubbled into the solution of cyanuric acid until the gain in weight of the solution indicates that two mols of chlorine have reacted with one mol of cyanuric acid to form the dichlorocyanuric acid. Under the optimum conditions specified, the reaction proceeds rapidly and in substantially stoichiometric amounts. As long as the chlorination is conducted above about 5° C., an excess of chlorine is not harmful since it is merely wasted and no trichlorocyanuric acid is formed. If about two mols or less of a strong base is present in the reaction mixture for each mol of cyanuric acid, the dichlorocyanuric acid forms a precipitate when approximately two mols of chlorine have been added to the solution and the cyanuric acid has been converted to dichlorocyanuric acid. Also, under such conditions excess chlorine added to the solution no longer reacts, and consequently, the unreacted chlorine imparts a characteristic yellowish color to the solution. This phenomenon may be employed as a visual end point for the reaction if the weight gain method is not utilized to determine when the cyanuric acid has been converted to dichlorocyanuric acid. However, if the reaction is carried on with substantially more than two mols of base per mol of cyanuric acid, no precipitate is formed and no characteristic color is produced by excess chlorine. Under such circumstances, the weight gain method is employed to determine when the reaction is complete.

Another method of chlorinating cyanuric acid to form dichlorocyanuric acid is by mixing trichlorocyanuric acid with cyanuric acid in the presence of water or a suitable solvent for both compounds. A ratio of one mol of cyanuric acid reacts with two mols of trichlorocyanuric acid to form dichlorocyanuric acid. Any excess of trichlorocyanuric acid above the two mols remains in the mixture and tends to decompose. However, as long as less than about two mols of trichlorocyanuric acid is employed per mol of cyanuric acid, the trichlorocyanuric acid is converted into the lower chlorinated compounds of cyanuric acid which are relatively stable compared to the trichlorocyanuric acid and which are excellent bleaching and disinfecting agents. Consequently, mixing cyanuric acid with trichlorocyanuric acid provides a method of stabilizing trichlorocyanuric acid so that it may be spray dried without a large loss of available chlorine. Also, when dichlorocyanuric acid is prepared by mixing cyanuric acid and trichlorocyanuric acid, there is no chloride formed as a by-product of the reaction. This result is desirable because the dichlorocyanuric acid becomes somewhat unstable in the presence of the chloride ion. Furthermore, this method of forming dichlorocyanuric acid from cyanuric acid and trichlorocyanuric acid requires very little equipment, and the solid reactants can advantageously be mixed in the presence of a small amount of water in order to form the dichlorocyanuric acid.

The amount of water employed for conducting the reaction between cyanuric acid and trichlorocyanuric acid is not particularly critical. The reaction may be carried out with sufficient water to provide a solution of the reactants, a slurry, a plastic mass, or merely sufficient water to moisten the reactants. When the cyanuric acid is chlorinated with trichlorocyanuric acid, the reaction mixture is mechanically agitated or mixed until the components are thoroughly combined. The reaction may be conducted anywhere within the range of temperature and pH previously specified for preparation of dichlorocyanuric acid with gaseous elemental chlorine.

If the dichlorocyanuric acid has been precipitated from a solution of the reactants, the pure compound may be separated from the aqueous reaction media and dried by any conventional means. When dichlorocyanuric acid is formed in a solution that contains two mols or less of a strong base per mol of cyanuric acid, the yield of dichlorocyanuric acid precipitate is substantially increased by chilling the solution to a temperature between about 0° C. to 5° C. If more than two mols of a strong base is employed in preparation of the dichlorocyanuric acid, the dichlorocyanurate salt may be converted into dichlorocyanuric acid precipitate by addition of an acid. Separation of the precipitate from the reaction is effected by any conventional filtration means.

The dichlorocyanuric acid obtained from a solution as a precipitate, or from a slurry, or from the moistened reactants is washed with cold water preferably between about 0° C. and 5° C. in order to remove impurities, and then it is dried. Conventional vacuum drying techniques or heating the compound at temperatures below about 125° C. may be utilized. Temperatures above 125° C. are not employed since they tend to cause decomposition of the dichlorocyanuric acid. Also, solutions and slurries of dichlorocyanuric acid, or its salts if excess base was added, are readily spray dried in conventional spray drying equipment and they remain stable under the spray drying conditions. This new chlorinated cyanuric acid compound, or in other words dichlorocyanuric acid, has properties that clearly distinguish it from the well-known trichlorocyanuric acid as illustrated by the following comparison:

MELTING POINT

Dichlorocyanuric acid—212° to 213° C. With an electrically heated metal block preheated to 193° C., the powdered compound in a sealed capillary melted at 223° to 224° C.

Trichlorocyanuric acid—Slight decomposition at 181° to 182° C. Melts at 205° to 209° C. When a metal block was preheated to 195° C., the melting range was 215° to 221° C.

ELEMENTAL ANALYSIS, PERCENT

|  | Dichlorocyanuric Acid | Trichlorocyanuric Acid |
| --- | --- | --- |
| Carbon | 18.3 | 16.0 |
| Hydrogen | .59 | .13 |
| Nitrogen | 21.1 | 18.5 |
| Chlorine | 35.75 | 44.8 |

AVAILABLE CHLORINE ON FRESHLY PREPARED COMPOUND BY ACTUAL TITRATIONS

|  | Percent |
| --- | --- |
| Dichlorocyanuric acid | 71.4 |
| Trichlorocyanuric acid | 92.2 |

INFRARED SPECTRA—THE MOST CHARACTERISTIC ABSORPTION PEAKS (MICRONS) IN THE INFRARED REGION

Dichlorocyanuric acid _____ 14.05
Trichlorocyanuric acid _____ 14.30

The remainder of the absorption spectra is characteristic for each compound and provides a means of identification.

X-RAY DIFRACTION

The X-ray diffraction pattern of the two compounds are entirely different. The $d$ values in Angstrom units for the principal diffraction lines are as follows:

| Dichlorocyanuric Acid | Trichlorocyanuric Acid |
| --- | --- |
| 5.68 | 4.72 |
| 3.76 | 4.14 |
| 3.17 | 3.45 |
| 3.00 | 3.15 |
| 2.44 | 2.48 |

POTENTIOMETRIC TITRATION

The pH titration curves are characteristic for each compound. When reacted with standard sodium hydroxide, dichlorocyanuric acid has a pH titration curve typical of a moderately strong monobasic acid with a $pK_{acid}$ value of 4. Trichlorocyanuric acid has a pH titration curve with two inflections corresponding to $pK_{acid}$ values of 4 and 7.6.

SOLUBILITY IN ACETONE AT 25° C.

|  | Grams per hundred milliliters |
| --- | --- |
| Dichlorocyanuric acid | 17 |
| Trichlorocyanuric acid | 37 |

DIFFERENTIAL THERMAL ANALYSIS

The differential thermal analysis curves are characteristic for trichlorocyanuric acid and for dichlorocyanuric acid. Trichlorocyanuric acid shows a strong endothermic reaction at 195° C. before starting to melt at 206° C. Dichlorocyanuric acid shows neither endothermic or exothermic reaction before starting to melt at 216° C.

While the foregoing data apply to the pure dried form of dichlorocyanuric acid, the acid is obtained as a hydrate when it is precipitated from an aqueous solution and before it is dried. Also, salts of the acid are readily prepared by placing the dichlorocyanuric acid in a solution of the hydroxide of any alkali metal, alkaline earth metal, or trivalent metal. Examples of dichlorocyanurates that have been prepared are the sodium, potassium, lithium, barium, calcium, thorium, aluminum, and thallium salts of dichlorocyanuric acid. At least stoichiometric amounts of the hydroxide are required to form the corresponding cyanurate. For example, a solution containing one mol of sodium hydroxide and one mol of dichlorocyanuric acid forms the sodium salt of dichlorocyanuric acid. The salts are readily obtained from their solutions by evaporating the excess water in any well known manner or by conventional spray drying techniques. Such salts possess bleaching, sterilizing, and disinfecting properties, because similar to dichlorocyanuric acid, their aqueous solutions contain the dichlorocyanurate anion, or in other words $(C_3N_3O_3Cl_2)^-$.

The other dihalocyanurates are prepared in the same manner as the dichlorocyanurates except that basic solutions containing bromine and iodine are employed as the halogenating agents in place of gaseous chlorine. In addition to its chlorinating, bleaching and disinfecting properties, the dihalocyanurate anion is useful as an oxidizing agent, and as a halogenating agent for halogenating organic compounds. For example, ethyl alcohol is oxidized to acetaldehyde, and 5,5-dimethylhydantoin is chlorinated to form 1,3-dichlorodimethylhydantoin by the dichlorocyanurate anion. For laundering as well as for general household purposes, the dichlorocyanurate is most advantageously employed instead of the other dihalocyanurates because of its gentle action on fabrics, and its lower cost. In addition the alkali metal dichlorocyanurates or solutions containing alkali metals, such as sodium and potassium, are employed in laundering and in the household because they are easy to remove by rinsing, the alkali metal dichlorocyanurates being more soluble than the acid. Thus the potassium and sodium dichlorocyanurate salts are preferred for most purposes.

Although the dihalocyanurate anion, in the form of dihalocyanuric acid or its salts, may be utilized alone for bleaching, disinfecting or deodorizing, the active compound is most advantageously mixed with a synergistic carrier agent when it is to be used for such purposes. Incorporation of the synergistic agent enables the final product to be more readily dispensed, it prevents caking by keeping apart the organic ingredients, provides a product that is stable on storage, and provides the pH in the desired range for greatest activity of the dihalocyanuric acid. The synergistic agent is selected from inexpensive non-hygroscopic compounds that are stable, non-reactive with dihalocyanuric acid, have good flow properties, and which readily dissolve in water. When used for household purposes, the carrier agent should yield a clear solution when it is dissolved. In addition a carrier which is also a buffering agent that increases and controls the pH up to about 11 and preferably in a range between about 6.5 and 9.5 with or without the presence of organic detergents is most advantageously employed. The stability of the dichlorocyanuric acid is somewhat reduced as the pH is increased above 9.5, and at a pH below about 6.5 there is a tendency for volatile hypochlorous acid to be formed in the solution. Since the pH of pure dichlorocyanuric acid dissolved in water in a concentration of 200 p.p.m. is 3.6, the importance of the synergistic carrier agent in increasing and maintaining the increased pH is clearly evident.

Suitable carrier agents having the foregoing properties are readily selected from the alkali metal (e.g. sodium potassium) phosphates, polyphosphates, tripolyphosphates, silicates, borates, and carbonates, as well as neutral salts, such as sodium sulfate. Examples of such salts are sodium carbonate, sodium bicarbonate, trisodium phosphate, sodium silicate, sodium tetraphosphate, sodium tetraborate, sodium tripolyphosphate and sodium sesquicarbonate. The halides are generally unsatisfactory since they tend to cause decomposition of the dichlorocyanuric acid. Also, ammonium salts cannot be used as carrier agents because they cause serious degradation of the active ingredient as well as reactions which produce dangerous explosive combinations. Sodium sulfate and sodium tripolyphosphate are extremely useful as diluents, and mixtures of such compounds are of the greatest value since they provide a buffer solution having a pH in the preferred range of 6.5 to 9.5.

Some household products, such as scouring cleaners and dishwashing compositions, which advantageously include a dichlorocyanurate, usually contain carrier agents which are more alkaline than sodium tripolyphosphate, e.g. sodium carbonate and sodium phosphate. The pH of such products can range up to about 11.

The pH of solutions made up from dichlorocyanuric acid in combination with various ratios of sodium tripolyphosphate and sodium sulfate are given below. These solutions were prepared to contain 100 p.p.m. available chlorine from a solid formulation containing 10 percent by weight available chlorine.

| Weight ratio, sodium tripolyphosphate to sodium sulfate | pH |
|---|---|
| 1:0 | 9.03 |
| 3:1 | 8.84 |
| 1:1 | 7.43 |
| 1:3 | 6.88 |
| 0:1 | 3.70 |

From the above data it is seen that when sodium tripolyphosphate is used along with dichlorocyanuric acid at a typical laundry concentration of available chlorine, the pH produced is one which yields an active bleaching and disinfecting environment. The sodium tripolyphosphate increases the pH of the solution, provides a buffering action to control the pH and imparts detergent and sequestering properties and particle strength. The sodium sulfate adds additional filler material, and in the desired proportions it provides a pH at which the greatest activity of the composition is obtained without a tendency for the formation of the volatile hypochlorous acid. Best results are obtained with mixtures of dichlorocyanuric acid, sodium tripolyphosphate and sodium sulfate in which the weight ratio of sodium tripolyphosphate to sodium sulfate is in the range of 3:1 to 1:3. When potassium or sodium dichlorocyanurate is originally included in the composition instead of the dichlorocyanuric acid, very little tripolyphosphate is required to raise and maintain the pH of solutions of the composition to the desired range, and large amounts of the neutral alkali metal sulfate may be employed. In such cases the weight ratio of tripolyphosphate to dichlorocyanurate salt should be in the range of between about 3:1 and 1:7, and the alkali metal sulfate should constitute more than about 30 percent of the mixture of such three components.

The carrier agents may advantageously be mixed with the dihalocyanurate by incorporating them in the aqueous medium in which the dihalocyanuric acid is prepared. When the mixture is dried, the synergistic carrier agents will be automatically intermixed with the dihalocyanuric acid in the form of a homogeneous mass. For example, a slurry or solution of dichlorocyanuric acid and the carrier agent is readily prepared either by mixing the carrier agent with a solution or slurry of the cyanuric acid before it is chlorinated to form the dichlorocyanurate in the manner previously described, or by mixing the carrier agent and the dichlorocyanurate with water after the dichlorocyanurate has been separately prepared. In either case, the resultant mixture may be advantageously dried by conventional means such as spray drying with standard equipment by techniques well known in the industry. The density and the particle size of the mixture is readily regulated during the spray drying operation. Furthermore, the dissolved dihalocyanurate and the synergistic carrier agent come out of solution together to form a homogeneous mass that does not stratify when packaged, and the dihalocyanurate remains stable under the spray drying conditions.

Alternatively, the carrier agent can be mixed with cyanuric acid, trihalocyanuric acid, and sufficient water to form a slurry, an agglomeration or plastic mass during formation of the dihalocyanurate, and the mixture is then readily dried by any convenient means such as by spray drying, by use of a vacuum or by heating to temperatures below about 125° C. Similarly the previously prepared dihalocyanurate can be mixed with small amounts of water and the synergistic carrier agent to form a plastic mass or agglomeration that is readily dried because of the small amount of moisture present.

A particularly effective method of obtaining an intimate mixture of the carrier agent and dihalocyanurate is to employ sodium sulfate decahydrate in the synergistic carrier agent. When sodium sulfate decahydrate is heated to a temperature above about 32° C., which is conveniently just above usual room temperature, water is liberated from the hydrate. The hydrate again solidifies when the temperature falls below 32° C., and it forms a homogeneuos mass with the intermixed dihalocyanurate. The amount of hydrate in the carrier agent may readily be regulated to provide either a plastic mass or an agglomeration of the mixture of dihalocyanurate and carrier agent by employing some of the anhydrous carrier agent as well as other carrier agents. The plastic mass is advantageously extruded in sheet or string form while it is still plastic to provide a large surface area for efficient drying. Any convenient means of drying, such as by hot air or with a rotary kiln, may be employed, and the solidified form can readily be broken up into a powder and screened.

Substantial economies in the drying process are obtained by employing as little water as is necessary to form a homogeneous mass of carrier agent and dihalocyanurate, regardless of whether the water is added as free water or in the form of the hydrate. Furthermore, the addition of a small amount of water to form the homogeneous mixture enables granules of the composition having a controlled density to be formed by a very advantageous procedure. If about five to fifteen percent by weight of water is included based on the weight of the dry mixture, an agglomeration of carrier agent and dihalocyanurate is provided that forms a relatively dense homogeneous product when it is dried. As little as about nineteen percent by weight water based on the weight of the dry mixture (or in other words 16 percent moisture content) forms a plastic mass. As the amount of water employed for combining the carrier agent and the dihalocyanurate is increased up to about one hundred percent by weight based on the weight of the dry components, or in other words until the moisture content of the mixture is about 50 percent, the density of the final dried product decreases until a relatively light fluffy product is obtained. In this way the product density can easily be adjusted. If more than one hundred percent by weight water is added, no further substantial changes in the density of the final product are obtained.

In preparing the granules of controlled bulk density by this granulation method the dichlorocyanurate and the carrier agent are for best results mixed with sufficient water to provide a composition having between about 15 and 50 percent by weight moisture content. If the initial moisture content is substantially above about 30 percent by weight or if it is desired to reduce the bulk density of the product, the moisture content is reduced by preliminary drying to between about 7 and 30 percent. Any conventional drying means, such as the use of vacuum or heat below 125° C., may be employed. The moisture content of the initial mixture and the moisture content after preliminary drying, if any, govern the final product density. These moisture contents can readily be adjusted to vary the final product density, with a dense product being provided by the lower moisture contents and progressively decreasing density provided with the higher moisture contents.

After the moisture content of the plastic mass is adjusted to between about 7 and 30 percent by weight in this granulation procedure, the mass is broken up into granules by any suitable disintegrating means. For example, the mass may be forced through a screen and then disintegrated. If the composition has a moisture content above about 30 percent at the time of disintegration, the resulting granules tend to agglomerate instead of forming the desired free flowing particles. On the other hand if the moisture content is below about 10 percent at the time of disintegration, a dusty powder tends to form instead of the desired granules. Such a powder is troublesome for the manufacturer and for the user of the composition. Finally, after disintegration, the granules are dried to a low moisture content preferably to below about 3 percent. This is an effective way of preparing the composition without spray drying. In this manner the bulk density of the granules has been varied from between about 400 and 900 grams per liter depending upon the moisture content that was employed.

For economy and convenience, a suitable dry bleach composition for home laundry use should contain about 5 to 50 percent, preferably 5 to 25 percent by weight available chlorine. A concentration in these ranges permits the use of readily available measuring cups to measure the amount of the bleaching composition that should be placed in the washing machine. A wash water containing sufficient dichlorocyanurate to provide about one hundred parts per million available chlorine is a typical example of a suitable concentration for washing. The proportion of dichlorocyanurate and diluent in compositions for use in bleaching, sterilizing and disinfecting is most advantageously regulated to provide a compounded product that countains about 10 percent by weight available chlorine. In other words, the composition preferably contains about fourteen percent parts by weight of dichlorocyanurate. For some purposes, however, such as in scouring powders, as little as about 0.5 percent by weight available chlorine is sufficient.

The composition of dichlorocyanurate and synergistic carrier agent may be applied directly as a bactericide or disinfecting agent by spreading the composition on moistened surfaces or by adding water to the composition. Also, the composition of dichlorocyanurate anion and carrier agent can be used as a bleaching agent for commercial or home laundering as a means of whitening and brightening fabrics. Any of the usual detergents utilized for laundering may be employed together with the dichlorocyanurate composition. Examples of such detergents are alkyl benzene sulfonates with alkyl radicals containing from 9 to 18 carbon atoms and alkyl sulfates with alkyl radicals containing from 10 to 18 carbon atoms. Specific examples are sodium alkyl benzene sulfonate in which the alkyl radical is derived from polypropylene and averages 12 carbon atoms, sodium lauryl sulfate and sodium tallow alkyl sulfate.

The dichlorocyanurate hereof mixed with a synergistic carrier produces a superior bleaching, sterilizing and disinfecting agent that remains stable and free flowing under conditions of high temperature and high humidity. Also, as previously mentioned, it remains stable when it is spray dried. These are important advantages in a packaged dry bleach, since the stability of the compound enables it to retain its activity long after it has been packaged. The bleach may be packaged in any suitable container, such as paperboard with a glassine or aluminum foil liner, or a glass container. Also, inasmuch as it can be spray dried, the bleaching composition hereof is readily prepared by conventional spray drying techniques in the form of either light hollow spherical particles or in relatively compact granules. Such spray dried mixtures of dichlorocyanuric acid with carrier agents remain homogeneous and do not stratify in the package.

Measurements of the relative stability of dichlorocyanuric acid and trichlorocyanuric acid dissolved in water and maintained at 21° C. vividly illustrate the superior stability of the product hereof. When each of the compounds was made up to contain 0.8 gram in 50 milliliters of water, dichlorocyanuric acid was found to lose 4 percent of its original available chlorine in one hour. Under the same conditions, trichlorocyanuric acid lost 20 percent of its available chlorine.

Another test was conducted with dry compound formulations of dichlorocyanuric acid and trichlorocyanuric acid each mixed with a sufficient amount of the same carrier agent mixture to provide a composition having 8 percent available chlorine. The carrier agent mixture was sodium tripolyphosphate and sodium sulfate in a ratio of one part to three parts by weight. When maintained in a humidity cabinet at a relative humidity of 85 percent and a temperature of 38° C., the compounded dichlorocyanuric acid lost 4 to 10 percent of its available chlorine in twelve days storage, while the compounded trichlorocyanuric acid lost 20 to 30 percent available chlorine under the same conditions. Furthermore, when samples of each of these compounded formulations were made plastic with water and allowed to stand at room temperature, the dichlorocyanuric acid mass lost 1½ to 4 percent of its original available chlorine in eleven days, whereas the trichlorocyanuric acid mass lost 21 to 25 percent in a period of one hour.

In order to test the relative bleaching power of dichlorocyanurate anion and illustrate its effectiveness compared to the commonly used bleaching compounds, a test was conducted using solutions containing one hundred parts per million of available active chlorine. One cup of "Tide," a detergent sold by Proctor & Gamble was inserted in sixteen gallon solutions of each of the bleaching agents tested. Eight pounds of clothes were washed twice in each of the different solutions containing the various bleaching compounds using successive fifteen minute washing cycles with fresh solution in each cycle, and employing a water temperature of 52° C. Measurements of the clothes were made with a reflectometer before the clothes were washed and after the two fifteen minute washings. The following reflectance readings clearly illustrate the effectiveness of dichlorocyanurate as a bleach:

Control _____ 72.0
A commercial solution of sodium hypochlorite ___ 79.4
A preparation of 10% by weight dichlorocyanuric acid mixed with 90 percent by weight carrier agent[1] _____ 81.1
A commercial preparation of trichlorocyanuric acid _____ 79.9
A commercial preparation of 1,3-dichloro-5,5-dimethylhydantoin _____ 76.2

[1] The carrier agent was composed of one part by weight of sodium tripolyphosphate and three parts by weight sodium sulfate.

In addition to its other advantages, the sterilizing and disinfecting properties of dichlorocyanurate render it extremely effective as a bactericide. As a test of its effectiveness in killing bacteria, solutions of dichlorocyanurate anion and various common bactericides were prepared and allowed to stand for twenty-four hours. The materials were titrated and adjusted immediately before use to contain exactly the amount of available chlorine specified in the following table. However, one ml. of the bactericide suspensions was added to ten ml. of each solution, thus giving the mixture a 10 percent lower concentration of available chlorine.

TABLE

[Results of percentage-kill method]

| Material Tested | Available Chlorine, p.p.m. | Exposure Time, Minutes | Bacterial Count after Exposure | Percentage-Kill of Initial Count (141×10⁹) of B. coli |
|---|---|---|---|---|
| A commercial solution of sodium hypochlorite | 50 | 3 | 290 | 99.99 |
| | 50 | 4 | 0 | 100 |
| Spray dried mixture of 10 percent by weight dichlorocyanuric acid with 90 percent by weight of sodium tripolyphosphate and sodium sulfate in the ratio of 1 to 1. | 50 | 3 | 110 | 99.99 |
| | 50 | 4 | 30 | 99.99 |
| Spray dried mixture of 10 percent by weight dichlorocyanuric acid with 90 percent by weight sodium tripolyphosphate. | 50 | 3 | 120 | 99.99 |
| | 50 | 4 | 0 | 100 |
| A commercial preparation of trichlorocyanuric acid | 50 | 3 | 1,950 | 99.99 |
| | 50 | 4 | 20 | 99.9 |
| A commerical preparation of 1,3-dichloro-5,5-dimethyl-hydantoin. | 50 | 3 | 5,400,000 | 96.17 |
| | 50 | 4 | 200,000 | 99.99 |
| Dichlorocyanuric acid | 50 | 3 | 0 | 100 |
| Sodium dichlorocyanurate | 50 | 3 | 40 | 99.99 |

The foregoing tests vividly illustrate the superior advantages of dichlorocyanuric acid as a sterilizing and disinfecting agent. Furthermore, standard tests with solutions of dichlorocyanuric acid and its salts in concentrations of 100 parts per million show complete kill of B. coli and Staphylococcus aureus bacteria in 15 seconds.

The following are specific examples of the preparation of dihalocyanurates and mixtures of dihalocyanurates with synergistic carrier agents in accordance with this invention.

*Example I*

An amount of cyanuric acid equal to 31.7 grams (0.245 mol) was dissolved in 750 ml. water containing 22.6 grams (0.56 mol) sodium hydroxide. This solution was maintained at room temperature of about 30° C. and gaseous chlorine was bubbled into it until the mixture increased in weight by 40.2 grams. A white solid settled from the solution. It was separated on a filter, washed with 100 cc. of cold water at 5° C., dried on a porous plate, and then in a vacuum desiccator. This product weighed 43.4 grams which is an 89.5 percent yield. It was analyzed with the following results: Carbon 18.3 percent, hydrogen 0.59 percent, nitrogen 21.1 percent, chlorine 35.75 percent, and available chlorine 71.4 percent, which shows that it is dichlorocyanuric acid.

The dried compound was further characterized by means of infrared analysis, differential thermal analysis, melting point, and potentiometric titration, and it was found to have the distinctive properties previoulsy specified herein.

*Example II*

Sixty-five grams of the dichlorocyanuric acid prepared in the manner described in Example I were dissolved in 300 ml. of 1.0 molar (12.8 grams) sodium hydroxide solution at a temperature of 40° C. The solution was cooled to ice temperature, and a product separated out which was filtered and dried. Upon analysis, the dry material was found to be the sodium salt of dichlorocyanuric acid. An analysis showed the presence of 10.4 percent by weight sodium, 62.6 percent by weight available chlorine and the ratio of percent available chlorine to percent sodium was 6.0. This material was dissolved in dilute sulfuric acid to yield a solution from which cyanuric acid was recovered in its original form, as indicated by elemental analysis.

*Example III*

A slurry was prepared by adding 100 parts of a solid which contained commercially available trichlorocyanuric acid, containing 86 percent by weight available chlorine, and cyanuric acid in a ratio of 10 to 2 in one liter of water. This slurry was mixed intimately in a blender and samples were taken after 15, 30 and 60 minutes. In each case upon analysis the product was found to contain dichlorocyanuric acid as the principal constituent. Characterization was made by the same techniques as described in Example I.

*Example IV*

A slurry which was prepared by adding 100 parts of a solid which contained commercially available trichlorocyanuric acid (86 percent available chlorine) and cyanuric acid in the weight ratio of 10 to 2 in one liter of water at 24° C., was passed through a commercial spray dry apparatus. Air at a temperature of 260° C. was employed for the spray drying, and the dryer walls were kept above 105° C. to evaporate water and to insure a dry product. Upon analysis the spray dried product showed an over-all loss of not more than 4 percent of its original available chlorine. The spray dried product was characterized and was found to contain dichlorocyanuric acid as its principal constituent.

*Example V*

A 50 percent water slurry was prepared by adding 125 pounds of a mixture containing 10 pounds of commercial trichlorocyanuric acid (86 percent available chlorine) and 2 pounds of cyanuric acid together with 81 pounds of sodium sulfate, 27 pounds of sodium tripolyphosphate, and 5 pounds of sodium alkyl benzene sulfonate, the alkyl group being derived from polypropylene and averaging 12 carbon atoms. This slurry was spray dried in a commercial apparatus using an air temperature of about 260° C. and an exit temperature of 93° C.

The final product, which contained about 7 percent available chlorine, had a particle size range between 100 and 1000 microns. The spray dried product was used as a bleaching agent in a typical home laundry washing machine in the proportions of one cup to a 16 gallon load. This yielded a concentration of about 75 parts per million available chlorine in the wash water and produced bleaching, deodorizing, and disinfecting in the articles washed.

*Example VI*

A mixture of 10 pounds of trichlorocyanuric acid (86 percent available chlorine) and 2 pounds of cyanuric acid was prepared together with a carrier agent consisting of 81 pounds of sodium sulfate and 27 pounds of sodium tripolyphosphate. The dry materials were thoroughly mixed to form a homogeneous mass and then 40 pounds of water was added and completely mixed. This resulted in the formation of a plastic mass which was extruded through a screen and allowed to dry at a temperature of about 20° C. When the dried material had become hard and had a moisture content of about 25 percent, the mass was passed through a commercial disintegrating device to produce particles from about 100 to 1,000 microns mean diameter. It was then dried at a temperature of about 95° C. and screened to remove fine particles from the mixture. This product, which contained as a principal ingredient dichlorocyanuric acid, was taken and used as a disinfecting and sanitizing agent on counters, trays, and food containers.

Following this same granulation procedure, dry bleaching compositions of varying density were prepared by changing the moisture content as specified in the following table. The bulk density listed is for the fraction of medium size particles (105–1000 microns) of each test.

| Moisture Content (percent) | | Bulk Density (g./liter) |
|---|---|---|
| Initial | At Disintegration | |
| 42 | 30 | 439 |
| 37.5 | 29 | 441 |
| 37.5 | 25 | 484 |
| 37.5 | 14 | 519 |
| 28.5 | 23 | 562 |
| 23 | 12 | 684 |
| 16 | 10 | 802 |

*Example VII*

Ten pounds of dichlorocyanuric acid was mixed together with 184 pounds of sodium sulfate decahydrate, and 27 pounds of sodium tripolyphosphate. This material was thoroughly mixed to form a homogeneous mass, and then heated to a temperature slightly above 32° C. at which time the mass became plastic. The mixing was continued until complete uniformity was obtained. The resultant mass was extruded through a screen and allowed to cool below a temperature of 31° C., at which time it became hard. The mass was then dried by forced air at about 30° C. until it had a moisture content of about 20 percent. It was then broken into particles of about 1000 microns mean diameter by passing through a commercial disintegrator. Next, the particles were finally dried by gradually raising the temperature from room temperature up to about 95° C. for the remainder of the drying period, until it had a moisture content of about 2 percent. This homogeneous product was found to be ideally suited for packaging as a dry bleach material suitable for use in the home for disinfecting, stain removing, washing machine bleaching and other applications requiring an oxidizing and chlorinating agent.

We claim:
1. The method of preparing a sterilizing and disinfecting powder that is homogeneous throughout which comprises mixing ingredients consisting essentially of a dichlorocyanurate with a synergistic carrier agent mixture of sodium tripolyphosphate and sodium sulfate decahydrate, heating said mixture until water is liberated from said sodium sulfate decahydrate, allowing said mixture to cool until a solid homogeneous mass is formed, and pulverizing said homogeneous mass to form said powder, said dichlorocyanurate being present in an amount sufficient to provide said powder with from about 0.5 to about 50 percent by weight available chlorine.

2. The method of preparing a bleaching, sterilizing and disinfecting powder that is homogeneous throughout which comprises: mixing ingredients consisting essentially of a dichlorocyanurate and a synergistic carrier agent mixture of sodium tripolyphosphate and sodium sulfate decahydrate; heating said mixture above about 32° C. until water is liberated from said sodium sulfate decahydrate, forming a plastic mass; mixing said plastic mass; extruding said mass through a screen; allowing said mass to cool below about 32° C. until the mass solidifies; drying and pulverizing said solidified mass to form a powder; and then drying said powder to drive off moisture; said powder containing dichlorocyanurate in an amount sufficient to provide said powder with from about 0.5 to about 50 percent by weight available chlorine.

References Cited by the Examiner

UNITED STATES PATENTS

| Re. 24,412 | 12/1957 | Hardy | 252—99 |
| 2,184,883 | 12/1939 | Muskat et al. | 260—248 |
| 2,184,886 | 12/1939 | Muskat et al. | 260—248 |
| 2,430,233 | 11/1947 | Magill | 252—187 |
| 2,795,556 | 6/1957 | Quinn | 252—99 |
| 2,815,311 | 12/1957 | Ellis et al. | 252—187 |
| 2,897,154 | 7/1959 | Low | 252—99 |
| 2,921,911 | 1/1960 | Staubly et al. | 252—99 |
| 2,980,622 | 4/1961 | Symes | 252—99 |
| 2,993,745 | 7/1961 | Dorsett | 252—99 |

FOREIGN PATENTS

| 551,042 | 12/1957 | Canada. |
| 576,904 | 6/1959 | Canada. |

OTHER REFERENCES

Chenicek: "Active Chlorine Compounds—Their Chemistry and Application," Textile Research Journal, vol. 16, pp. 219–225, May 1946.

Hands: Journal of the Society of Chemical Industry, vol. 67, pp. 66–69.

SAMUEL H. BLECH, *Primary Examiner.*

JULIUS GREENWALD, JOSEPH R. LIBERMAN, ALBERT T. MEYERS, *Examiners.*

J. E. MOERMOND, *Assistant Examiner.*